United States Patent
Schober et al.

(10) Patent No.: US 12,546,869 B2
(45) Date of Patent: Feb. 10, 2026

(54) METHOD AND DEVICE FOR TIME-OF-FLIGHT ESTIMATION IN A COMMUNICATIONS SYSTEM

(71) Applicant: NXP B.V., Eindhoven (NL)

(72) Inventors: Michael Schober, Graz (AT); David Veit, Graz (AT); Stefan Tertinek, Graz (AT)

(73) Assignee: NXP B.V., Eindhoven (NL)

( * ) Notice: Subject to any disclaimer, the term of this patent is extended or adjusted under 35 U.S.C. 154(b) by 350 days.

(21) Appl. No.: 18/170,024

(22) Filed: Feb. 16, 2023

(65) Prior Publication Data

US 2024/0288556 A1    Aug. 29, 2024

(51) Int. Cl.
G01S 7/4865    (2020.01)
H04B 1/7163    (2011.01)

(52) U.S. Cl.
CPC ........ *G01S 7/4865* (2013.01); *H04B 1/71637* (2013.01)

(58) Field of Classification Search
CPC . G01S 7/4865; G01S 5/06; G01S 5/02; G01S 5/0273; H04B 1/71637
See application file for complete search history.

(56) References Cited

U.S. PATENT DOCUMENTS

| | | | | |
|---|---|---|---|---|
| 2019/0331782 A1* | 10/2019 | McLaughlin | ............ | G01S 5/06 |
| 2020/0386844 A1* | 12/2020 | Park | .......................... | G01S 3/18 |
| 2021/0051622 A1* | 2/2021 | Manolakos | ........... | H04W 64/00 |
| 2021/0061225 A1* | 3/2021 | Ahmed | ................. | H04W 4/023 |
| 2022/0078578 A1 | 3/2022 | Brumley et al. | | |
| 2022/0137177 A1* | 5/2022 | Hammerschmidt | .... | G01S 7/006 |
| | | | | 455/456.1 |
| 2022/0345184 A1 | 10/2022 | Haslinger et al. | | |
| 2022/0390541 A1* | 12/2022 | Chen | ........................ | G01S 5/04 |
| 2023/0164001 A1* | 5/2023 | Hong | ................. | H04L 25/0212 |
| | | | | 375/260 |

(Continued)

FOREIGN PATENT DOCUMENTS

| CN | 110850364 B | 7/2021 |
|---|---|---|
| CN | 111929669 B | 11/2021 |
| DE | 102019202010 B3 | 7/2020 |

OTHER PUBLICATIONS

Pirch, Hans-Juergen et al.; "Introduction to Impulse Radio UWB Seamless Access Systems"; Proceedings of the Fraunhofer SIT ID: Smart Workshop; Feb. 19-20, 2020; Darmstadt, Germany.

*Primary Examiner* — William Kelleher
*Assistant Examiner* — Kenneth W Good

(57) ABSTRACT

A method is provided for estimating a time-of-flight (TOF) in a wireless communication between first and second devices. The method includes receiving a signal, transmitted from the second device, at first and second antennas of the first device. The second antenna is spaced apart from the first antenna on the first device. A difference in arrival time of the received signal at the first antenna and at the second antenna is computed by the first device. A non-line-of-sight (NLOS) signal path of the received signal in a TOF estimation is compensated for using the difference in arrival time of the received signal between the first antenna and the second antenna. In another embodiment, a communications device having multiple antennas is provided that compensates for the NLOS signal path using the method.

17 Claims, 7 Drawing Sheets

(56) References Cited

U.S. PATENT DOCUMENTS

| | | | |
|---|---|---|---|
| 2023/0296714 A1* | 9/2023 | Alpert | G01S 1/045 |
| | | | 375/147 |
| 2023/0324501 A1* | 10/2023 | Feigl | G01S 5/0273 |
| | | | 342/451 |
| 2023/0417861 A1* | 12/2023 | Edge | H04W 64/003 |
| 2024/0085552 A1* | 3/2024 | Kim | G01S 13/878 |

* cited by examiner

METHOD AND DEVICE FOR TIME-OF-FLIGHT ESTIMATION IN A COMMUNICATIONS SYSTEM

BACKGROUND

Field

This disclosure relates generally to communications, and more particularly, to a method and device for time-of-flight (TOF) estimation in a communications system.

Related Art

In wireless localization, devices can transmit and receive information related to distance to determine a position of one device relative to another device. For example, one device (e.g., a handheld device such as a smartphone) may perform ranging with another device (e.g., an anchor device) to determine the position of the handheld device relative to the anchor device. However, ranging is often inaccurate in environments where reflections, multipath scenarios, and/or multiple localization devices are present. A time-of-flight (TOF) measurement may be used in the ranging operation between the two devices.

Ultra-wideband (UWB) technology utilizes a signal bandwidth greater than 500 MHz which allows for a centimeter accurate TOF measurement. Even though the signal bandwidth allows for a high measurement accuracy, the measured TOF can be biased, e.g., if a line-of-sight (LOS) signal is, e.g., blocked between two devices.

Therefore, what is needed is a method for a TOF estimation that is more accurate in non-line-of-sight (NLOS) conditions.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
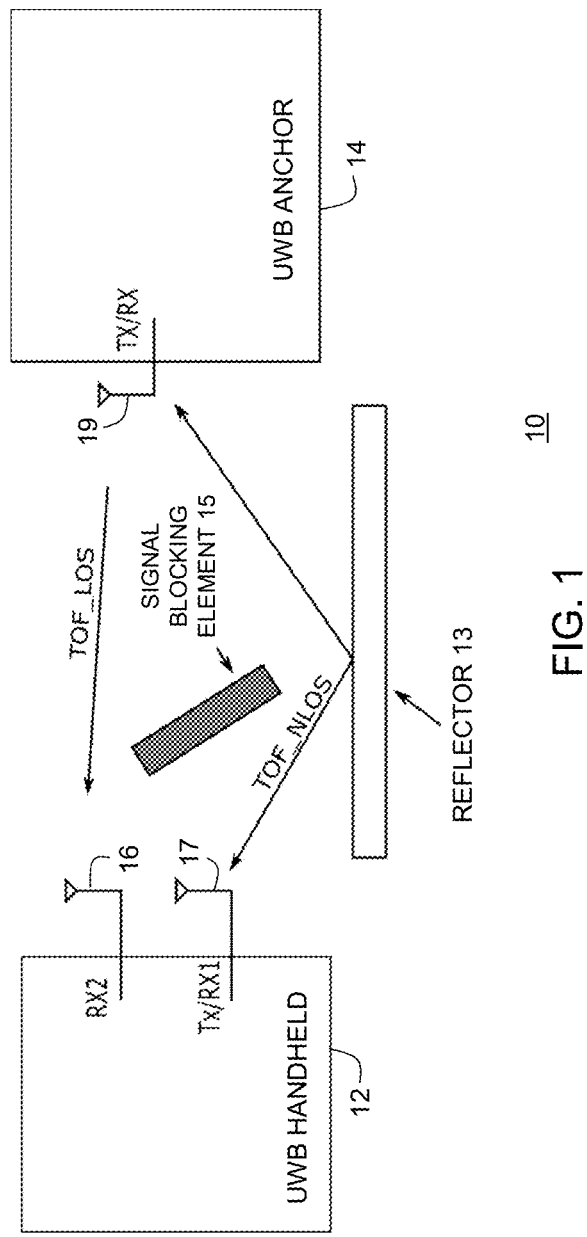
FIG. 1 illustrates a communications system having a multi-antenna handheld device performing ranging with an anchor device in NLOS conditions.

Generally, there is provided, a method for TOF estimation with a non-line-of-sight (NLOS) compensation in a wireless communication between, e.g., a handheld device having two or more antennas and another device, e.g., an anchor device. In the wireless communication, in one embodiment, the handheld device receives a signal at both a first antenna and a second antenna of the handheld device. The first antenna and the second antenna are spaced apart from each other on the handheld device so that in one example, one of the first or second antennas is in a NLOS relationship with the anchor device. The handheld device determines an arrival time of the received signal at the first and second antennas. A difference in arrival times of the received second signal at the first antenna and second antenna is computed. A NLOS signal path error in a TOF estimation can be compensated for using the difference in arrival time of the received signal between the first and second antennas. In one embodiment, the handheld device computes the compensated TOF estimate, and in another embodiment, the anchor device computes the TOF estimate.

The method seamlessly provides a TOF estimation with NLOS compensation that can be applied on top of any existing ranging protocol and is transparent to other devices in a communications system. The method is based on computationally inexpensive equations and thus, does not contribute to increased power consumption. The method requires only a minimum amount of computing power making it suitable for low cost and low power systems.

In accordance with an embodiment, there is provided, a method for time-of-flight (TOF) estimation, the method including: performing a wireless communication between a first device and a second device, the wireless communication including: receiving a signal from the second device at a first antenna of the first device and at a second antenna of the first device, wherein the second antenna is spaced apart from the first antenna on the first device; determining a difference in arrival time of the received signal at the first antenna and at the second antenna; and compensating for a non-line-of-sight (NLOS) signal path of the received signal in a TOF estimation using the difference in arrival time of the received signal between the first antenna and the second antenna. A first receiver may be coupled to the first antenna of the first device, and a second receiver may be coupled to the second antenna of the first device. A channel impulse response (CIR) of each of the first and second receivers may be postprocessed independently to determine the difference in arrival time of the received signal at the first and second antennas. Compensating for the NLOS signal path may include subtracting the difference in arrival time from a round trip TOF estimation between the first device and the second device to determine an adjusted round trip TOF estimate. The TOF estimation may be determined by averaging the adjusted round trip time. A first timestamp of the received signal at the first antenna and a second timestamp of the received signal at the second antenna may be used to determine the difference in arrival time. The first antenna and the second antenna may both be coupled to a same receiver circuit. The TOF estimation may be used in a ranging operation. The first device and the second device may be parts of an ultra-wideband (UWB) system. The first device may be a handheld device and the second device may be an anchor device.

In another embodiment, there is provided, a method for time-of-flight (TOF) estimation between a first device and a second device, the method including: receiving a signal from the second device at both a first antenna and a second antenna of the first device, wherein the received signal is part of a communication between the first device and the second device, and wherein the second antenna is spaced apart from the first antenna on the first device; determining a difference in arrival time of the received signal at the first antenna and the second antenna; and compensating for a non-line-of-sight (NLOS) signal path in a TOF estimation by subtracting the difference in arrival time of the received signal in the TOF estimation. A first receiver may be coupled to the first antenna of the first device, and a second receiver may be coupled to the second antenna of the first device. A channel impulse response (CIR) of each of the first and second receivers may be postprocessed independently to determine the difference in arrival time between the second and third signals. The TOF estimation may be used in a ranging operation. The first device may be a smartphone and the second device may be an anchor device.

In yet another embodiment, there is provided, a communications device including: a transmitter circuit in the communications device configured to be selectively coupled to a first antenna; a first receiver circuit in the communications device configured to be selectively coupled to the first antenna; a second receiver circuit in the first device configured to be coupled to a second antenna spaced apart from each other, wherein both the first and second receiver circuits configured to receive a signal transmitted by another communications device; a memory configured to store a time-of-flight (TOF) estimation code; and a processor configured to execute the TOF estimation code, wherein the TOF estimation code is configured to compensate for a non-line-of-sight (NLOS) signal path of the received signal at one of the first and second antennas of the first device in a TOF estimation using a difference in arrival time of the received signal between the first and second receiver circuits. The communications device may be implemented in one or more integrated circuits. The communications device may be a ultra-wideband (UWB) communications device. The NLOS error may be compensated for by subtracting the difference in arrival time of the received signal from a round trip TOF between the communications device and the another communications to compute an adjusted round trip time. The TOF estimation may be determined by averaging the adjusted round trip time.

FIG. 1 illustrates communications system 10 having multi-antenna handheld device 12 and anchor device 14 performing ranging in NLOS conditions. In one embodiment, communication system 10 is a UWB communications system. UWB handheld device 12 has two antennas 16 and 17 that can be used for ranging; antenna 16 is receive only (RX2) and antenna 17 can be used for transmit and receive (TX/RX1). Antennas 16 and 17 may share a receiver circuit or there may be one receiver circuit for each of antennas 16 and 17. For example, in FIG. 1, antenna 16 is coupled to a UWB receiver circuit (RX2) and antenna 17 is coupled to a UWB transmitter circuit (TX) and a UWB receiver circuit (RX1). Antennas 16 and 17 are spaced apart on handheld device 12. UWB anchor device 14 has only one antenna 19 that can be used for transmit and receive (TX/RX). Because of blocking element 15 between antenna 17 of handheld device 12 and antenna 19 of anchor device 14, no line-of-sight (LOS) signal can be transmitted from handheld device 12 to anchor device 14, but reflector 13 allows reception of a non-LOS (NLOS) signal path by anchor device 14. For example, handheld device 12 may be a smartphone that has at least one antenna radiating to the side and one radiating to the back. Depending on the orientation of the smartphone, antenna 17 may be blocked by, for example, a phone casing resulting in a NLOS signal path to antenna 19 on anchor device 14, while antenna 16 may have a direct LOS signal path to anchor device 14. This means a UWB ranging operation between two devices may report a time-of-flight (TOF) that is biased by the TOF_NLOS.

UWB systems such as communications system 10 are typically designed to deliver the smallest upper bound of a distance estimate, meaning in case of a packet reception by a device, the shortest path estimated by the receiver is always used for RX time stamp calculation. In the example shown in FIG. 1, if the signal travels from antenna 19 of anchor device 14 to antenna 16 of handheld device 12, a receiver associated with antenna 16 will be used for the timestamp estimation because the TOF_LOS signal path is shorter than the TOF_NLOS signal path.

Figure 2:
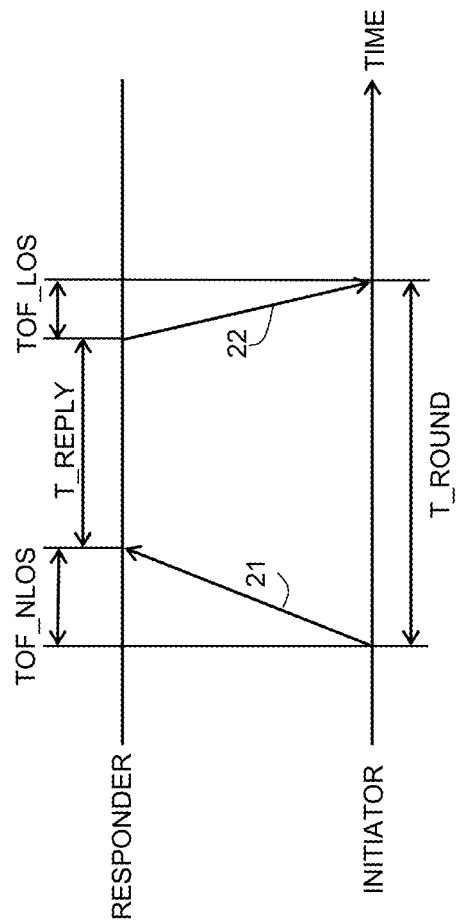
FIG. 2 illustrates a timing diagram for a single-sided two-way ranging (SS-TWR) message exchange.

FIG. 2 illustrates a timing diagram for a single-sided two-way ranging (SS-TWR) message exchange between an initiator device (INITIATOR) and a responder device (RESPONDER). In FIG. 2, the initiator device may be, e.g., handheld device 12 and the responder device may be, e.g., anchor device 14. The SS TWR may be based on the system shown in FIG. 1. In FIG. 2, the initiator initiates the SS-TWR by transmitting a signal 21 to the anchor using antenna 17. Signal 21 may include a message or a packet or may be another type of communication or ranging signal. Signal 21 takes a NLOS signal path to anchor device 14 because, e.g., signal 21 may be blocked by a blocking element such as blocking element 15. A time for transmission of signal 21 is represented by TOF_NLOS in FIG. 2. The responder responds to signal 21 of the initiator one T_REPLY time period later, and the T_REPLY time is measured on the responder side and shared with the initiator. The T_REPLY time includes a time required by the responder device to transmit a signal after reception of signal 21. A response signal 22 is transmitted by the responder device and received by the initiator device one TOF_LOS time period after it has been transmitted. The initiator device already knows the T_REPLY time period because it has already been shared by the responder, and the initiator can compute the T_ROUND time between the transmission of signal 21 and the reception of signal 22 using timestamps. In one embodiment, the timestamps may be generated from, or associated with, a scrambled timestamp sequence (STS) bit field of a transmitted packet, or the timestamps may be part of a payload field of a transmitted packet. In one embodiment, a timestamp may be derived from a STS of a received packet and then transmitted in a payload field of a response packet together with the transmit timestamp corresponding to the response packet.

A SS-TWR equation (1), shown below, is applied on the timestamps known by the initiator. Equation (1) shows that the estimated TOF is not the TOF_LOS but a mean, or average, between the TOF_LOS and TOF_NLOS which can lead to a big measurement error.

$$\text{TOF\_est} = \frac{\text{T\_round} - \text{T\_reply}}{2} = \frac{\text{TOF\_NLOS} + \text{TOF\_LOS}}{2} \quad (1)$$

For example, assuming the TOF_LOS is 20 nanoseconds (ns) but the TOF NLOS is 30 ns, an application of equation (1) may provide a TOF estimate of 25 ns which is 5 ns more than the actual LOS TOF, resulting in a distance estimate error of up to about 1.5 meters for a TOF estimation of a UWB frequency signal exchange. Because one of the key performance indicators (KPIs) of a UWB system is to estimate the distance with centimeter (cm) accuracy, such offsets caused by NLOS measurements should be avoided.

Figure 3:
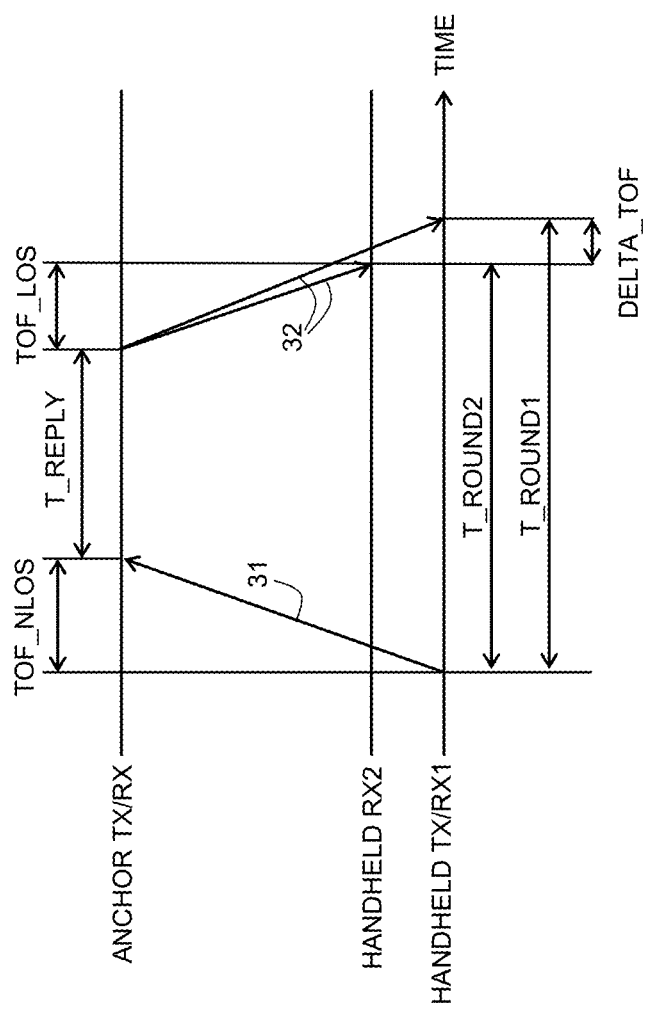
FIG. 3 illustrates a timing diagram for a SS-TWR message exchange for a TOF estimation with NLOS compensation in accordance with an embodiment.

FIG. 3 illustrates a timing diagram for a SS-TWR message exchange for a TOF estimation with NLOS compensation for a communications system such as illustrated in FIG. 1. Regarding FIG. 3, handheld device 12 uses antennas 16 and 17 and associated receivers to estimate two receiver (RX) timestamps. In the example, shown in FIG. 3, signal 31 is transmitted from handheld transmitter TX and antenna 17 to anchor device antenna 19 following a NLOS signal path. After time T_REPLY at anchor 14, a signal 32 is transmitted by anchor 14 and received by both handheld receivers RX1 and RX2 as indicated by the two arrows representing signal 32. Receiver RX2 is LOS to anchor 14, but receiver RX1 is NLOS. A time difference (DELTA_TOF) of received signal 32 at receiver RX1 and receiver RX2 is TOF_NLOS-TOF_LOS. The time difference DELTA_TOF can be observed by independently postprocessing the channel impulse responses (CIR) of the different receivers RX1 and RX2. By knowing the estimated time difference DELTA_TOF between the two receivers RX1 and RX2, a compensated TOF equation can be formed as shown in Equation (2):

$$TOF\_comp = \frac{T\_round2 - T\_reply - delta\_TOF}{2} = \frac{TOF\_LOS * 2}{2} \quad (2)$$

Equation (2) shown above assumes there is no clock frequency offset between handheld device 12 and anchor device 14, which might not be the case. Nevertheless, whether there is a clock frequency offset or not, the time difference DELTA_TOF can still be used for compensating NLOS conditions of the transmitter, because the impact of a frequency offset on the TOF is minimal.

Figure 4:
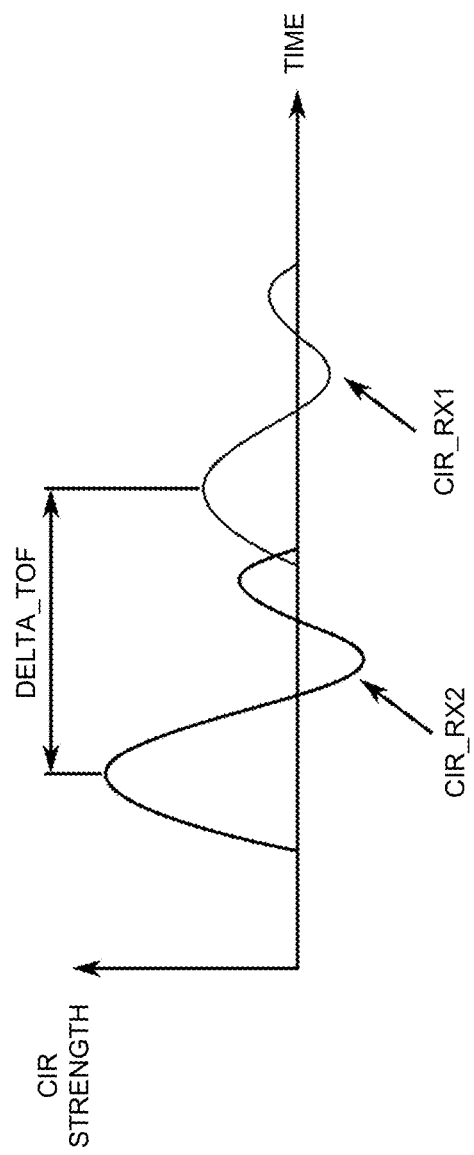
FIG. 4 illustrates a timing diagram for channel impulse response (CIR) of two antennas in a device in accordance with an embodiment.

FIG. 4 illustrates a timing diagram of a channel impulse response (CIR) of two receivers in accordance with an embodiment. In FIG. 4, the CIRs of RX1 and RX2 of handheld device 12 of FIG. 1 are estimated during the response packet reception (signal 32) as shown in FIG. 3. Since both CIRs are observed by the same device, just using different receivers, the time DELTA_TOF can be estimated by calculating a first-path peak difference between the two CIRs.

Figure 5:
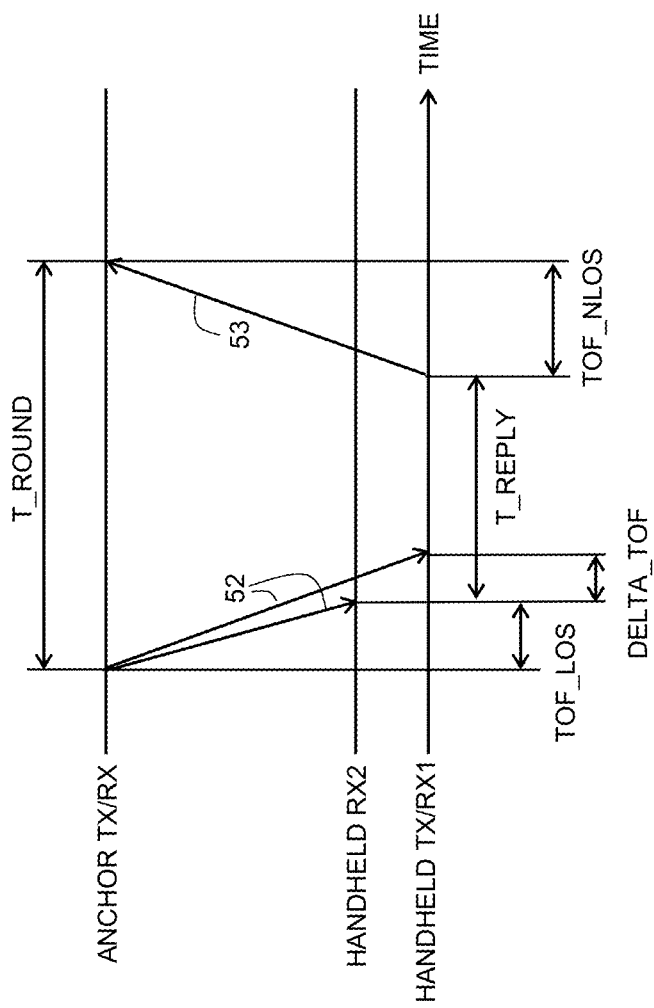
FIG. 5 illustrates a timing diagram for a SS-TWR message exchange for a TOF estimation with NLOS compensation in accordance with another embodiment.

FIG. 5 illustrates a timing diagram for a SS-TWR message exchange for use in a TOF estimation with NLOS compensation in accordance with another embodiment. The concept described above regarding FIG. 3 is an example of an NLOS condition observed on the ranging initiator side (handheld 12) of the SS-TWR. The NLOS condition can also happen on the responder side of the ranging. FIG. 5 shows handheld device 12 as the responder and anchor device 14 as the ranging initiator.

In the timing diagram of FIG. 5, anchor device 14 is the ranging initiator and transmits a signal, or packet, 52 to handheld device 12. Handheld device 12 receives signal 52 at receivers RX1 and RX2, where antenna 17 associated with receiver RX1 is NLOS to antenna 19 of anchor device 14. A difference (DELTA_TOF) is computed for signal 52 at receivers RX1 and RX2. Note that anchor device 14 does not have any information about the NLOS conditions of the transmitter of handheld device 12. Handheld device 12 shares its receiver timestamps so that anchor device 14 can apply an SS-TWR TOF estimation equation and compute a correct TOF estimate. That is, handheld device 12 shares its T_REPLY and T_REPY+DELTA_TOF. As mentioned above and illustrated in FIG. 4, the difference DELTA_TOF can be observed by comparing the two CIRs of receivers RX1 and RX2. This leads to Equation (3), where the only difference from Equation (2) is that the TOF is already compensated on the initiator side.

$$TOF\_comp = \frac{T\_round - T\_reply\_comp}{2} = \quad (3)$$
$$\frac{T\_round - T\_reply - delta\_TOF}{2} = \frac{TOF\_LOS * 2}{2}$$

Note that T_reply_comp is equal to T_reply+delta_TOF as shown in FIG. 5.

In general, the described method for TOF NLOS compensation seamlessly integrates with existing systems without having to modify the hardware on the anchor side. Also, an anchor device does not need to know anything about the TOF compensation method. The only rule that needs to be considered on a multi-RX device is to use a virtual TX timestamp of the closest receiver, or antenna, for the calculation of the reply or roundtrip time. Referring to the specific example of FIG. 1, this leads to Equations (4), (5), and (6) below, where Equation (6) is similar to Equation (3) except that the responder device is not aware the TOF NLOS compensation is being applied. That is, the responder device does not have to do anything differently compared to a conventional TOF estimation.

$$t\_tx\_comp = t\_TX\_RX1 + delta\_TOF \quad (4)$$

$$T\_reply\_comp = t\_tx\_comp - t\_RX\_RX2 \quad (5)$$

$$TOF\_comp = \frac{T\_round - T\_reply\_comp}{2} = \quad (6)$$
$$\frac{T\_round - T\_reply - delta\_TOF}{2} = \frac{TOF\_LOS * 2}{2}$$

In equations 4 and 5, small "t" refers to system clock time and capital "T" refers to a time difference. The variable t_TX_RX1 in equation (4) is the time on the handheld device clock (not shown) when a frame is transmitted. The variable t_tx_comp in equation (4) is a compensated TX timestamp that is derived by knowing t_TX_RX1 and delta_TOF Basically, this is the timestamp receiver RX2 would transmit with the signal. The variable t_RX_RX2 in equation (5) is the time on the handheld clock when receiver RX2 receives the signal. T_reply_comp in equation (5) is the reply time on the handheld device that has already considered the compensated TX time. By applying the TX timestamp compensation as shown above, the TOF NLOS compensation method can be integrated in any existing FiRa consortium and car connectivity consortium (CCC) protocols without a required change in the ranging sequence or the media access control (MAC). The method for TOF estimation with NLOS compensation can also be applied to double-sided two-way ranging (DS-TWR) as well as time-difference of arrival (TDOA) based ranging. Since the described method is able to compensate the TX-timestamp, it can be used on either the initiator side or responder side where multiple RX antennas are available. The method may be used for any wireless technology that computes distance based on timestamps. For example, the method may be used in the Bluetooth 2.4 GHz band, and in the future 6 GHz band. The method may also be used in WiFi (both legacy and future) and in long term evolution (LTE) 5G, 6G, and IMT, and general narrow-band radio.

Figure 6:
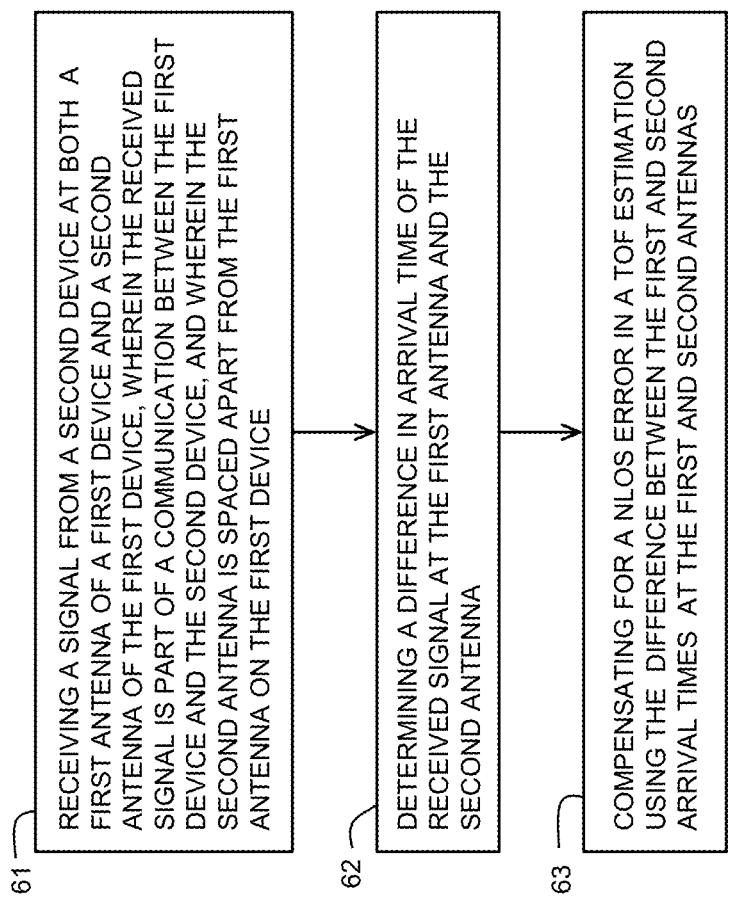
FIG. 6 illustrates a method for TOF estimation with NLOS compensation in accordance with an embodiment.

FIG. 6 illustrates method 60 for TOF estimation with NLOS compensation between a first device and a second device in accordance with an embodiment. The first device includes multiple antennas as shown in FIG. 1. Method 60 begins at block 61. At block 61, as part of a communication between the first device and the second device, a signal is received by the first device from the second device. The signal is received by both first and second antennas of the first device. The first and second antennas are spaced apart from each other on the first device. At block 62, a difference in arrival times of the received signal at the first and second antennas is determined. At block 63, an error in a TOF estimation caused by a NLOS signal path is compensated for using the difference in arrival times.

For a device having multiple antennas, the method provides seamless NLOS compensation using information received by the multiple antennas. This means the method can be applied on top of any existing ranging protocol transparent to other devices in a communications system. Since the method is based on computationally inexpensive equations it does not contribute to increased power consumption. The method requires only a minimum of computing power making it suitable for low cost and low power systems. The described method can be implemented efficiently on a standard microcontroller or digital signal processor (DSP) and requires only very limited memory resources.

Figure 7:
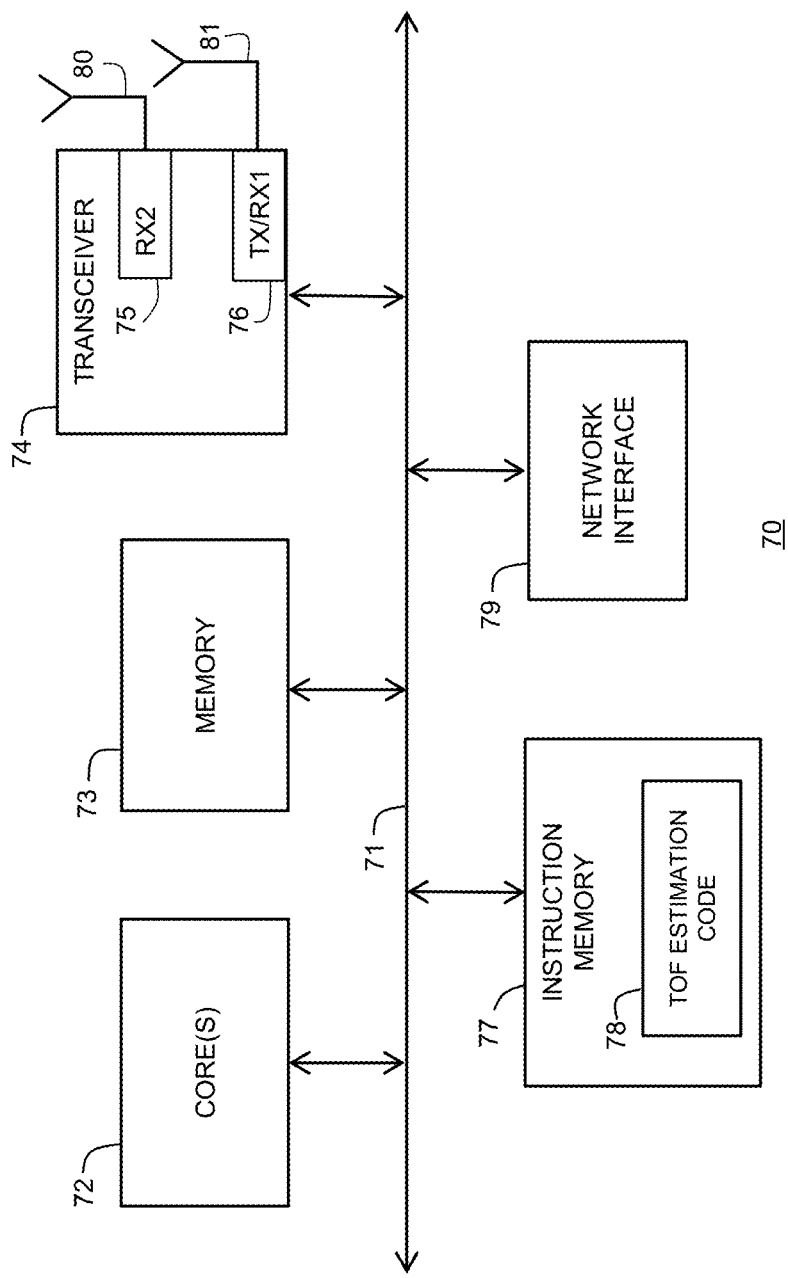
FIG. 7 illustrates a communications device in accordance with an embodiment.

FIG. 7 illustrates a communications device 70 useful for implementing the TOF estimation with NLOS compensation in accordance with an embodiment. Communications device 70 may be implemented on one or more integrated circuits and may be used in an implementation of the described embodiments. Communications device 70 includes bus 71. Connected to bus 71 is one or more processor cores 72, memory 73, transceiver 74, instruction memory 77, and network interface 79. The one or more processor cores 72 may include any hardware device capable of executing instructions stored in instruction memory 77. For example, processor cores 72 may execute TOF estimation instructions 78 stored in instruction memory 77. Processor cores 72 may be, for example, a microprocessor, field programmable gate array (FPGA), application-specific integrated circuit (ASIC), or similar device. Processor cores 72 may be implemented in a secure hardware element and may be tamper resistant.

Memory 73 may be any kind of memory, such as for example, L1, L2, or L3 cache or system memory. Memory 73 may include volatile memory such as static random-access memory (SRAM) or dynamic RAM (DRAM), or may include non-volatile memory such as flash memory, read only memory (ROM), or other volatile or non-volatile memory. Also, memory 73 may be implemented in a secure hardware element. Alternately, memory 73 may be a hard drive implemented externally to data processing system 70. In one embodiment, memory 73 may be used to store instructions such as the TOF estimation code 78 stored in instruction memory 77.

Transceiver 74 includes a transmitter, multiple receivers, and RF frontend coupled to antennas 80 and 81 to wirelessly communicate with other devices on a network and/or to provide localization services. In one embodiment, a receiver circuit (RX2) 75 is coupled to antenna 80, and transmitter and receiver circuits (TX/RX1) 76 are coupled to antenna 81 as assembled in handheld device 12 of FIG. 1. In one embodiment, transceiver 74 is a UWB transceiver. In another embodiment, one receiver circuit may be shared by both antennas 80 and 81. The described method for TOF NLOS compensation may be implemented using transceiver 74. Transceiver 74 is coupled to bus 71 to allow communication of information transmitted or received by antennas 80 and 81 with other circuits on a communications system.

Instruction memory 77 may include one or more non-transient machine-readable storage media for storing instructions for execution by processor cores 72. The instructions may include TOF estimation code 78 with the NLOS compensation for execution by processor cores 72. In other embodiments, both memories 73 and 77 may store data upon which processor cores 72 may operate. Memories 73 and 77 may also store, for example, encryption, decryption, and verification applications. Memories 73 and 77 may be implemented in a secure hardware element and be tamper resistant.

Network interface 79 may include one or more devices for enabling communication with other hardware devices. For example, network interface 79 may include, or be coupled to, a network interface card (NIC) configured to communicate according to the Ethernet protocol. Also, network interface 79 may implement a TCP/IP stack for communication according to the TCP/IP protocols. Various other hardware or configurations for communicating are available.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, flash memory, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for time-of-flight (TOF) estimation, the method comprising:
  performing a wireless communication between a first device and a second device, the wireless communication comprising:
    receiving a signal from the second device at a first antenna connected to a first receiver of the first device and at a second antenna connected to a second receiver of the first device, wherein the second antenna is spaced apart from the first antenna on the first device and the second device is an anchor device;

determining a first receiver timestamp indicating an arrival time of the received signal at the first antenna;

determining a second receiver timestamp indicating an arrival time of the received signal at the second antenna;

determining a difference in arrival time of the received signal at the first antenna and at the second antenna using the first receiver timestamp and the second receiver timestamp; and transmitting, by the first device and to the anchor device, the first receiver timestamp, the second receiver timestamp, and the difference in arrival time to cause the anchor device to determine a compensated TOF value by compensating for a non-line-of-sight (NLOS) signal path of the received signal in a TOF estimation using the first receiver timestamp, the second receiver timestamp, and the difference in arrival time of the received signal between the first antenna and the second antenna.

2. The method of claim 1, wherein a channel impulse response (CIR) of each of the first and second receivers is postprocessed independently to determine the difference in arrival time of the received signal at the first and second antennas.

3. The method of claim 1, wherein compensating for the NLOS signal path comprises subtracting the difference in arrival time from a round trip TOF estimation between the first device and the second device to determine an adjusted round trip TOF estimate.

4. The method of claim 3, wherein the TOF estimation is determined by averaging the adjusted round trip time.

5. The method of claim 1, wherein the TOF estimation is used in a ranging operation.

6. The method of claim 1, wherein the first device and the second device are parts of an ultra-wideband (UWB) system.

7. The method of claim 1, wherein the first device is a handheld device.

8. A method for time-of-flight (TOF) estimation between a first device and a second device, the method comprising:

receiving a signal from the second device at both a first antenna and a second antenna of the first device, wherein the received signal is part of a communication between the first device and the second device, and wherein the second antenna is spaced apart from the first antenna on the first device and the second device is an anchor device;

determining a first receiver timestamp indicating an arrival time of the received signal at the first antenna;

determining a second receiver timestamp indicating an arrival time of the received signal at the second antenna; and determining a difference in arrival time of the received signal at the first antenna and the second antenna using the first receiver timestamp and the second receiver timestamp; and transmitting, by the first device and to the anchor device, the difference in arrival time of the received signal to cause the anchor device to determine a compensated TOF value by compensating for a non-line-of-sight (NLOS) signal path in a TOF estimation by subtracting the difference in arrival time of the received signal in the TOF estimation.

9. The method of claim 8, wherein a first receiver is coupled to the first antenna of the first device, and a second receiver is coupled to the second antenna of the first device.

10. The method of claim 8, wherein a channel impulse response (CIR) of each of the first and second receivers is postprocessed independently to determine the difference in arrival time.

11. The method of claim 8, wherein the TOF estimation is used in a ranging operation.

12. The method of claim 8, wherein the first device is a smartphone.

13. A communications device comprising:
 a transmitter circuit in the communications device configured to be selectively coupled to a first antenna;
 a first receiver circuit in the communications device configured to be selectively coupled to the first antenna;
 a second receiver circuit in the first device configured to be coupled to a second antenna spaced apart from each other, wherein both the first and second receiver circuits configured to receive a signal transmitted by another communications device;
 a memory configured to store a time-of-flight (TOF) estimation code; and
 a processor configured to:
  determine, using the first receiver circuit, a first receiver timestamp indicating an arrival time of a received signal at the first antenna,
  determine, using the second receiver circuit, a second receiver timestamp indicating an arrival time of a received signal at the second antenna, and
  execute the TOF estimation code to determine a compensated TOF value, wherein the TOF estimation code is configured to compensate for a non-line-of-sight (NLOS) signal path of the received signal at one of the first and second antennas of the first device in a TOF estimation using a difference in arrival time of the received signal between the first and second receiver circuits using the first receiver timestamp and the second receiver timestamp.

14. The communications device of claim 13, wherein the communications device is implemented in one or more integrated circuits.

15. The communications device of claim 13, wherein the communications device is a ultra-wideband (UWB) communications device.

16. The communications device of claim 13, wherein the NLOS error is compensated for by subtracting the difference in arrival time of the received signal from a round trip TOF between the communications device and the another communications to compute an adjusted round trip time.

17. The communications device of claim 16, wherein the TOF estimation is determined by averaging the adjusted round trip time.

* * * * *